US012246444B2

(12) United States Patent
Wanaka

(10) Patent No.: US 12,246,444 B2
(45) Date of Patent: Mar. 11, 2025

(54) GEAR MECHANISM AND ROBOT

(71) Applicant: Nabtesco Corporation, Tokyo (JP)

(72) Inventor: Yuta Wanaka, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 18/186,516

(22) Filed: Mar. 20, 2023

(65) Prior Publication Data

US 2023/0347506 A1 Nov. 2, 2023

(30) Foreign Application Priority Data

Apr. 28, 2022 (JP) ................................. 2022-075004

(51) Int. Cl.

| | |
|---|---|
| ***B25J 9/10*** | (2006.01) |
| ***F16C 33/38*** | (2006.01) |
| ***F16H 49/00*** | (2006.01) |
| ***F16H 53/02*** | (2006.01) |
| ***F16H 55/08*** | (2006.01) |

(52) U.S. Cl.

CPC ............. *B25J 9/102* (2013.01); *B25J 9/1025* (2013.01); *F16C 33/3806* (2013.01); *F16C 33/3812* (2013.01); *F16H 49/001* (2013.01); *F16H 53/025* (2013.01); *F16H 55/0833* (2013.01); *F16C 2361/61* (2013.01)

(58) Field of Classification Search

CPC .............................. F16H 49/001; B25J 9/1025
USPC ....................................................... 74/490.03
See application file for complete search history.

(56) References Cited

U.S. PATENT DOCUMENTS 4,909,098 A * 3/1990 Kiryu .................... F16H 49/001
384/532
5,775,178 A * 7/1998 Asawa .................. F16H 49/001
74/640
5,906,142 A * 5/1999 Shirasawa ............ F16H 49/001
74/640

(Continued)

FOREIGN PATENT DOCUMENTS

EP 770794 A1 * 5/1997 ........... F16H 49/001
JP 6713208 B2 6/2020

(Continued)

OTHER PUBLICATIONS

Office Action dated Aug. 6, 2024, issued in corresponding Japanese Patent Application No. 2022-075004, with partial English translation (30 pgs.).

*Primary Examiner* — T. Scott Fix
(74) *Attorney, Agent, or Firm* — Pillsbury Winthrop Shaw Pittman, LLP

(57) ABSTRACT

One aspect of the present disclosure provides a strain wave gear device including an internal gear, an external gear and a wave generator. The wave generator has a cam and a fourth bearing. The cam has a non-circular outer peripheral surface, and the fourth bearing is positioned between the inner peripheral surface of the external gear and the outer peripheral surface of the cam. The fourth bearing has an outer ring, an inner ring, a plurality of balls, and a retainer. The strain wave gear device includes a restricting portion provided such that the restricting portion can avoid touching the retainer. The restricting portion can restrict the fourth bearing from moving in the direction extending along the axis of rotation.

4 Claims, 4 Drawing Sheets

(56) References Cited

U.S. PATENT DOCUMENTS

| | | | | | |
|---|---|---|---|---|---|
| 5,984,048 | A * | 11/1999 | Kiyosawa | F16H 49/001 184/6.12 |
| 6,065,362 | A * | 5/2000 | Kiyosawa | F16H 49/001 74/460 |
| 2014/0157925 | A1 * | 6/2014 | Yajima | F16H 49/001 74/412 R |
| 2017/0338718 | A1 | 11/2017 | Terashima et al. | |
| 2021/0140531 | A1 | 5/2021 | Kobayashi et al. | |

FOREIGN PATENT DOCUMENTS

| | | | |
|---|---|---|---|
| WO | 2020/044524 | A1 | 3/2020 |
| WO | WO-2022012712 | A1 * | 1/2022 |

* cited by examiner

GEAR MECHANISM AND ROBOT

CROSS-REFERENCE TO RELATED APPLICATIONS

This application is based on and claims the benefit of priority from Japanese Patent Application Serial No. 2022-075004 (filed on Apr. 28, 2022), the contents of which are hereby incorporated by reference in their entirety.

TECHNICAL FIELD

The present disclosure relates to a strain wave gear device and an industrial robot.

BACKGROUND

A strain wave gear device includes an internal gear, an external gear and a wave generator. The external gear is elastic and partially meshes with the internal gear, and the wave generator is in contact with the inner peripheral surface of the external gear. The wave generator causes the meshing between the internal and external gears to move in the circumferential direction, which extends around the axis of rotation. The wave generator has a cam and a bearing. The cam has an outer peripheral surface, and the bearing is positioned between the inner peripheral surface of the external gear and the outer peripheral surface of the cam. The outer peripheral surface of the cam is shaped like an ellipse with a major axis and a minor axis. The bearing is a deep groove ball bearing, for example. Such a bearing has an outer ring, an inner ring, rolling elements interposed between the outer and inner rings, and a retainer for retaining the rolling elements.

As the strain wave gear device described above is driven, the external gear elastically deforms to generate a thrust force in the wave generator. The thrust force may act to move the wave generator in the direction extending along the axis of rotation. Such movement may compromise correct meshing between the internal and external gears. This may result in excessive load on the bearing, which may lead to breakage of the bearing. The wave generator may be prevented from moving in the direction along the axis of rotation, for example, by restricting the cam from moving in the direction along the axis of rotation. This, however, may cause the bearing to move relative to the cam. To address this issue, a technology is disclosed that is designed to apply an adhesive between the cam and the bearing to enhance the adhesive strength between the cam and the bearing. Another technology is also disclosed that has a brim for restricting the retainer from popping out of the bearing as the thrust force is generated (see, e.g., International Publication No. 2020/044524).

The conventional technologies described above, however, hardly satisfy the required adhesive strength between the cam and the bearing due to contamination by oil and foreign matter. A brim, which is provided to restrict the retainer from popping out of the bearing, may not only impair the lubrication of the bearing but also crush the retainer and resultantly damage the bearing.

SUMMARY

The present disclosure is designed to provide a strain wave gear device and an industrial robot that are capable of restricting the bearing from moving in the direction along the axis of rotation and thereby protecting the bearing from being damaged.

An aspect of the present disclosure provides a strain wave gear device including an internal gear; an external gear radially inside the internal gear, the external gear being flexible; and a wave generator being in contact with an inner peripheral surface of the external gear. While partially meshing with the internal gear, the external gear rotates relative to the internal gear about an axis of rotation. The wave generator causes the meshing between the internal and external gears to move in a circumferential direction extending around the axis of rotation. The wave generator includes: a cam having a non-circular outer peripheral surface; and a bearing between the inner peripheral surface of the external gear and the outer peripheral surface of the cam. The bearing includes: an outer ring being in contact with the inner peripheral surface of the external gear; an inner ring being in contact with the outer peripheral surface of the cam; a plurality of rolling elements interposed between the inner ring and the outer ring; and a retainer retaining the plurality of rolling elements. The strain wave gear device further includes a restricting portion provided such that the restricting portion avoids touching the retainer, and the restricting portion restricts the bearing from moving in a direction extending along the axis of rotation.

In this way, the restricting portion is capable of restricting the bearing from moving in the direction along the axis of rotation while avoiding touching the retainer. The strain wave gear device is thus capable of restricting the bearing from moving in the direction along the axis of rotation and thereby protecting the bearing from being damaged.

In the implementation, the restricting portion may be shaped like a brim so that the restricting portion extends radially outward beyond the outer peripheral surface of the cam, and a radially outer end of the restricting portion may radially face the retainer with a gap therebetween.

In the implementation, the outer peripheral surface of the cam may be shaped like an ellipse or oval with a major axis and a minor axis when viewed in the direction extending along the axis of rotation, and the restricting portion may extend at least over the minor axis.

In the implementation, the restricting portion may have a circular shape when viewed in the direction extending along the axis of rotation. When d1 represents a length of the minor axis of the cam, t represents a thickness of the inner ring, and Φd represents a diameter of the restricting portion, expressions of $D1=d1+2\times t$ and $D1\geq\Phi d>d1$ may be satisfied.

In the implementation, the restricting portion may have a circular shape when viewed in the direction extending along the axis of rotation. When d2 represents a length of the major axis of the cam, t represents a thickness of the inner ring, and Φd represents a diameter of the restricting portion, expressions of $D2=d2+2\times t$ and $\Phi d\leq D2$ may be satisfied.

In the implementation, the restricting portion may be integrated with the cam.

Another aspect of the present disclosure provides a strain wave gear device including an internal gear; an external gear radially inside the internal gear, the external gear being flexible; and a wave generator being in contact with an inner peripheral surface of the external gear. While partially meshing with the internal gear, the external gear rotates relative to the internal gear about an axis of rotation. The wave generator causes the meshing between the internal and external gears to move in a circumferential direction extending around the axis of rotation. The wave generator includes: a cam having an outer peripheral surface; a bearing between the inner peripheral surface of the external gear and the outer peripheral surface of the cam; and a restricting portion shaped like a brim so that the restricting portion extends radially outward beyond the outer peripheral surface of the cam, the restricting portion having a circular shape when viewed in a direction extending along the axis of rotation. The bearing includes: an outer ring being in contact with the inner peripheral surface of the external gear; an inner ring being in contact with the outer peripheral surface of the cam; a plurality of rolling elements interposed between the inner ring and the outer ring; and a retainer retaining the plurality of rolling elements. The outer peripheral surface of the cam is shaped like an ellipse or oval with a major axis and a minor axis when viewed in the direction extending along the axis of rotation. The restricting portion restricts the bearing from moving in the direction extending along the axis of rotation. When d1 represents a length of the minor axis of the cam, t represents a thickness of the inner ring, and Φd represents a diameter of the restricting portion, and expressions of $D1=d1+2\times t$ and $D1\geq\Phi d>d1$ are satisfied.

In this way, the restricting portion is reliably capable of restricting the bearing from moving in the direction along the axis of rotation while reliably avoiding touching the retainer. The strain wave gear device is thus capable of reliably restricting the bearing from moving in the direction along the axis of rotation and thereby reliably protecting the bearing from being damaged. The restricting portion can be simply configured.

Another aspect of the present disclosure provides an industrial robot including a power generating unit for generating a rotational force; a strain wave gear device having an input part and an output part; and a mating member mounted on the output part of the strain wave gear device. The input part is configured to receive the rotational force produced and fed by the power generating unit, and the output part is configured to change a speed of rotation of the input part and output the rotation. The strain wave gear device includes: an internal gear; an external gear radially inside the internal gear, the external gear being flexible; and a wave generator being in contact with an inner peripheral surface of the external gear. While partially meshing with the internal gear, the external gear rotates relative to the internal gear about an axis of rotation. The wave generator causes the meshing between the internal and external gears to move in a circumferential direction extending around the axis of rotation. The external gear serves as one of the input part and the output part. The wave generator includes: a cam having a non-circular outer peripheral surface; and a bearing between the inner peripheral surface of the external gear and the outer peripheral surface of the cam. The cam serves as the other of the input part and the output part. The bearing includes: an outer ring being in contact with the inner peripheral surface of the external gear; an inner ring being in contact with the outer peripheral surface of the cam; a plurality of rolling elements interposed between the inner ring and the outer ring; and a retainer retaining the plurality of rolling elements. The strain wave gear device further includes a restricting portion provided such that the restricting portion avoids touching the retainer. The restricting portion restricts the bearing from moving in a direction extending along the axis of rotation.

Having the above-described configuration, the industrial robot is capable of restricting the bearing from moving in the direction along the axis of rotation and thereby protecting the bearing from being damaged.

The strain wave gear device and industrial robot described above are thus capable of restricting the bearing from moving in the direction along the axis of rotation and thereby protecting the bearing from being damaged.

DESCRIPTION OF THE PREFERRED EMBODIMENTS

The following describes embodiments of the present disclosure with reference to the drawings.

<Industrial Robot>

Figure 1:
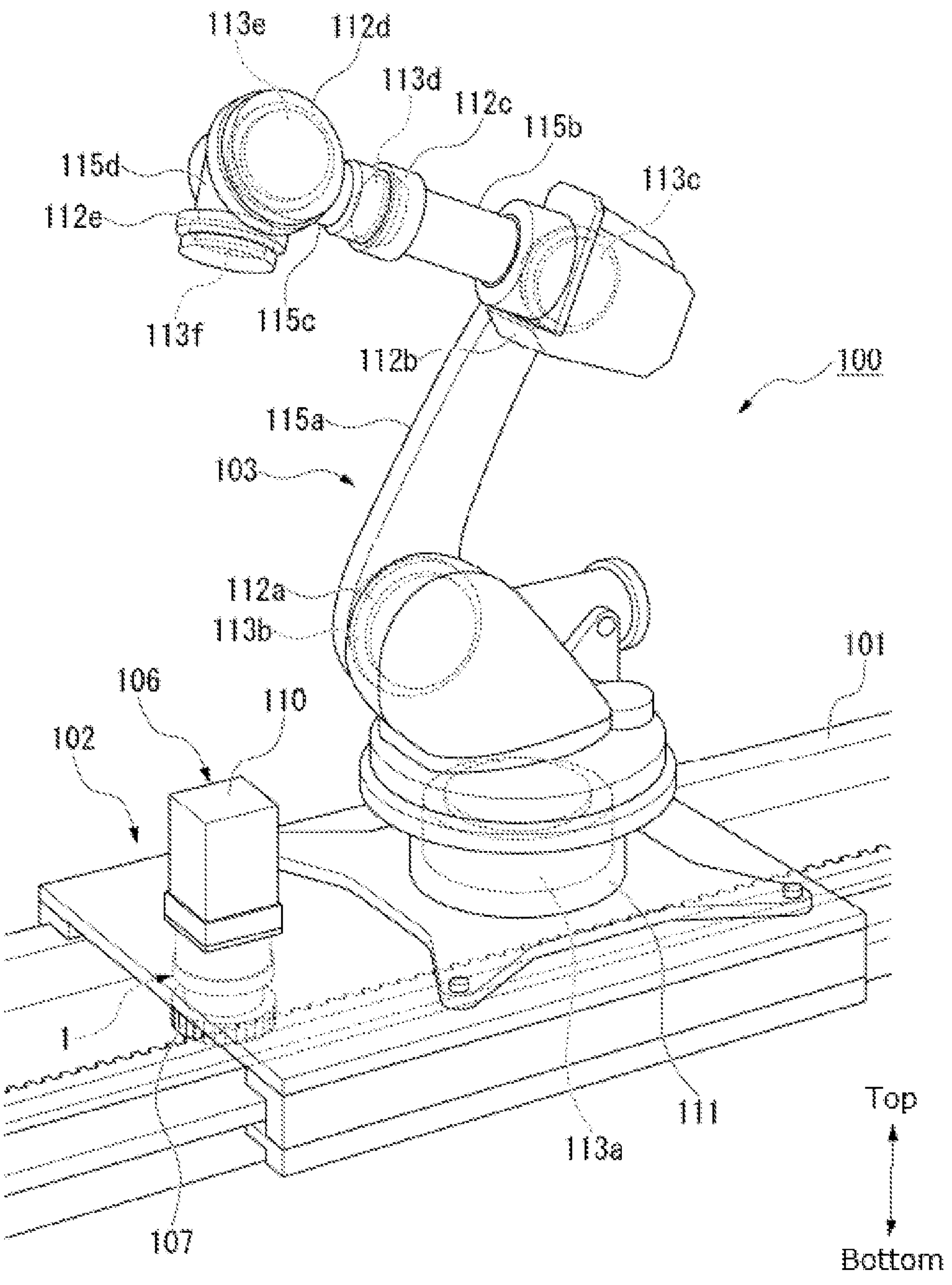
FIG. 1 schematically illustrates a configuration of an industrial robot relating to an embodiment of the present disclosure.

FIG. 1 is a schematic view showing the configuration of an industrial robot 100. As shown in FIG. 1, the industrial robot 100 has a traveling rail 101, a base unit 102 (an example of a mating member set forth in the claims) that is movable on the traveling rail 101, and a robot body 103 on the base unit 102. The base unit 102 and robot body 103 has arms (an example of the mating member set forth in the claims 115*a* to 115*d* having joints 111, 112*a* to 112*e*, which respectively have reducer-equipped motors 106, 113*a* to 113*f*.

The reducer-equipped motors 106, 113*a* to 113*f* are all configured in the same manner. Of the reducer-equipped motors 106, 113*a* to 113*f*, the reducer-equipped motor 106 on the base unit 102 is taken as an example. The reducer-equipped motor 106 has a strain wave gear device 1 and an electric motor 110 (an example of a power generating unit set forth in the claims) for applying power to the strain wave gear device 1.

In FIG. 1, the other reducer-equipped motors 113*a* to 113*f* are only simply shown, and their strain wave gear devices and electric motors are not identified by reference numbers. In the following description, only the reducer-equipped motor 106 of the base unit 102 will be discussed, and the other reducer-equipped motors 113*a* to 113*f* are not described. In the industrial robot 100, the reducer-equipped motors 106, 113*a* to 113*f* are driven, so that the robot body 103 runs on the traveling rail 101 and the arms 115*a*-115*d* assume various postures.

<Strain Wave Gear Device>

Figure 2:
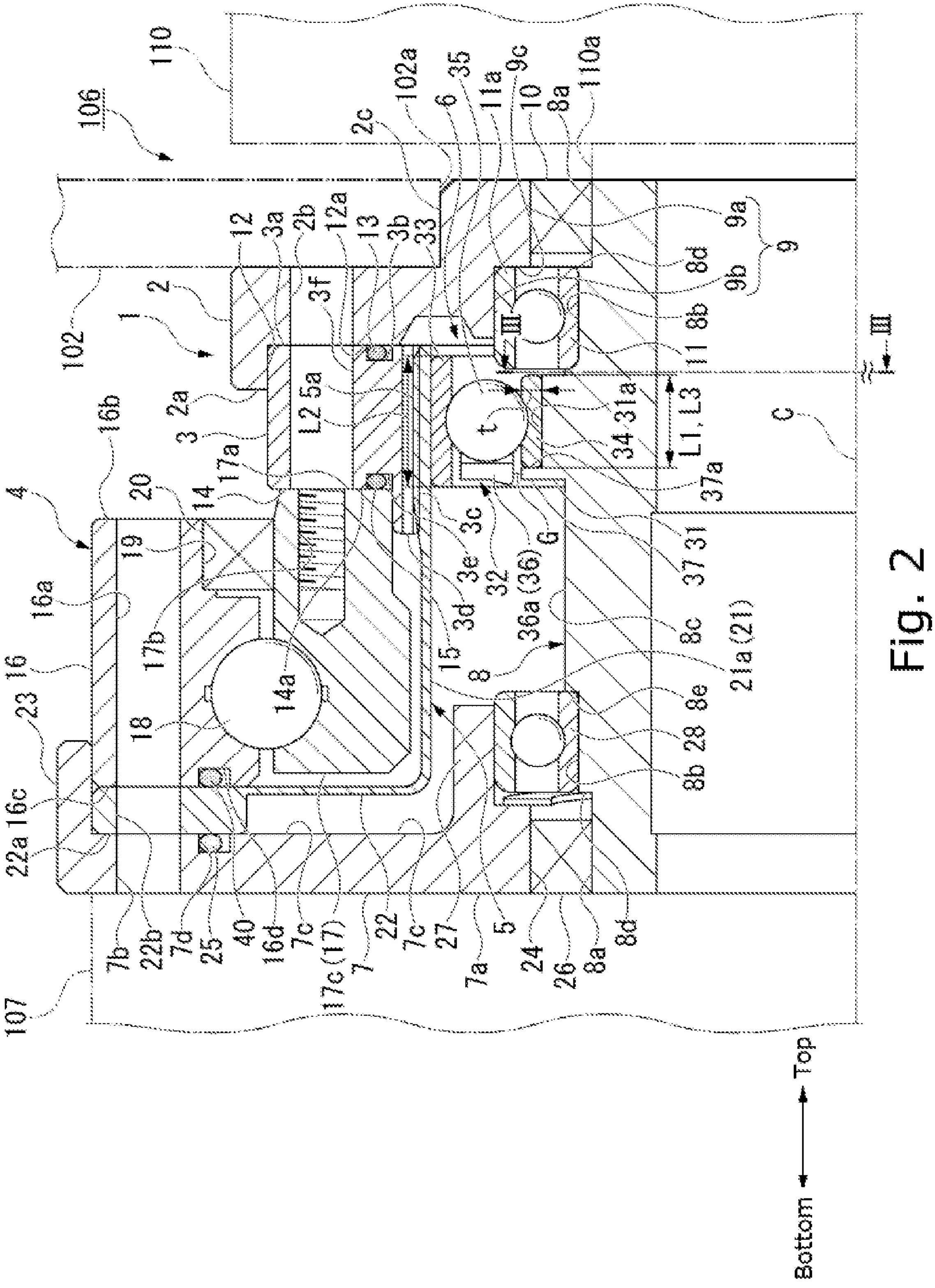
FIG. 2 is a sectional view showing a strain wave gear device relating to an embodiment of the present disclosure along an axis of rotation.
Figure 3:
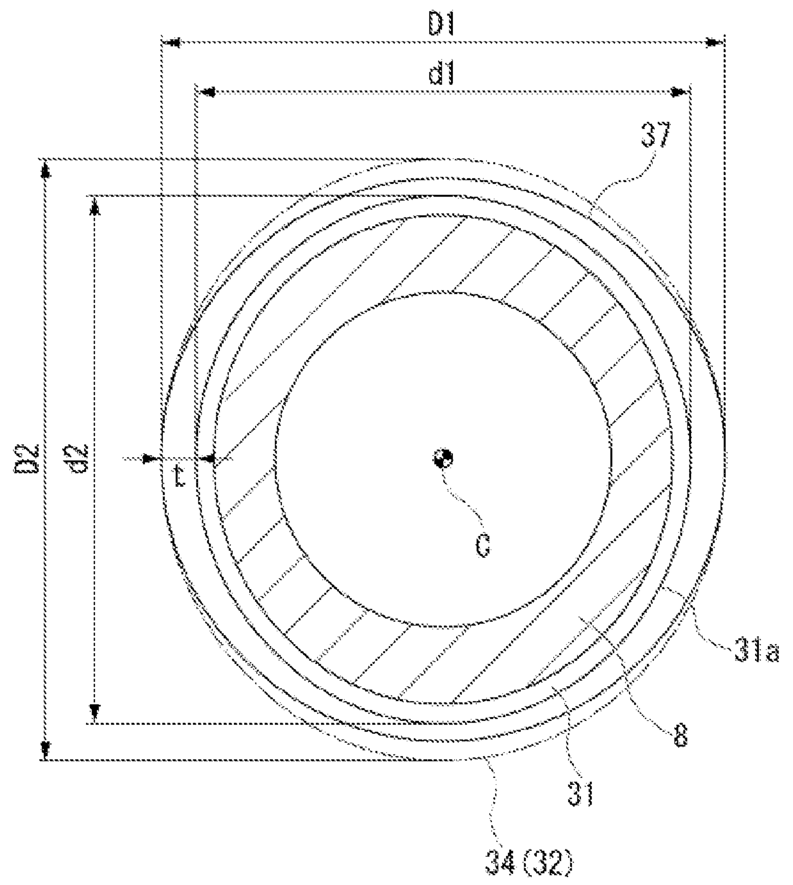
FIG. 3 is a radial sectional view showing a cam relating to an embodiment of the present disclosure.

The following now describes the strain wave gear device 1 with reference to FIGS. 2 to 3. FIG. 2 is a sectional view showing the strain wave gear device 1 along an axis of rotation C. In FIG. 2, the axis of rotation C is positioned at the center, and the lower half is not shown. In the following description, the terms "axial direction," "circumferential direction" and "radial direction" respectively refer to the direction along the axis of rotation C, the direction extending around the axis of rotation C, and the radial direction of the strain wave gear device 1 orthogonal to the axial and circumferential directions. In the following description, the upward and downward directions are defined with the reducer-equipped motor 106 being fixedly attached on the top of the base unit 102.

As shown in FIG. 2, the strain wave gear device 1 includes a housing 2, an internal gear 3 and a first bearing 4 fixedly attached to the housing 2, an external gear 5 radially inside the internal gear 3, a wave generator 6 radially inside the external gear 5, an output plate 7 (an example of an output part set forth in the claims) fixedly attached to the external gear 5 together with the first bearing 4, and a reducer shaft 8 coupled to a motor shaft 110*a* of an electric motor 110. The reducer shaft 8 is configured to impart a rotational force to the wave generator 6. The motor shaft 110*a* of the electric motor 110 is coupled to the upper end (the right end in FIG. 2) of the reducer shaft 8. The output plate 7 is located at the lower end (the left end in FIG. 2) of the reducer shaft 8.

<Housing>

The housing 2 is fixedly attached to the base unit 102 using bolts, which are not shown. The housing 2 is shaped like a circular plate. The shape of the housing 2, however, is not limited to the circular-plate shape. A columnar boss 2*c* is integrally formed with the housing 2 at the center in the radial direction. As the boss 2*c* is fitted into a through hole 102*a* formed in, for example, the base unit 102, the reducer-equipped motor 106 can be rightly positioned relative to the base unit 102.

A stepped through hole 9 extends through the boss 2*c* at the center in the radial direction and occupies a large part of it. The stepped through hole 9 is penetrated by the reducer shaft 8. The stepped through hole 9 is divided into a small-diameter hole 9*a* positioned on the upper side (facing the electric motor 110) and a large-diameter hole 9*b* positioned on the lower side of the small-diameter hole 9*a* (facing away from the electric motor 110). The large-diameter hole 9*b* is contiguous to the small-diameter hole 9*a* via a step 9*c*. The large-diameter hole 9*b* has a greater inner diameter than the small-diameter hole 9*a*.

A seal 10 is mounted onto the small-diameter hole 9*a* for establishing reliable sealing between the boss 2*c* and the reducer shaft 8. The seal 10 can be any one of various seal members such as rubber oil seals. A second bearing 11 is fitted into the large-diameter hole 9*b*. Via the second bearing 11, the upper end of the reducer shaft 8 is rotatably supported in the boss 2*c*. The second bearing 11 is a deep groove ball bearing, for example. The present disclosure, however, is not limited to such, and various bearings can be used. In the present embodiment, as the outer ring 11*a* of the second bearing 11 butts up against the step 9*c* in the stepped through hole 9, the second bearing 11 can be rightly positioned in the axial direction relative to the boss 2*c*.

A gear housing depression 12 is formed in the lower surface 2*a* of the housing 2 at the center in the radial direction and occupies a large part of it. The gear housing depression 12 is open downward and inward in the radial direction. The gear housing depression 12 receives therein the internal gear 3. A plurality of through holes 2*b* extend in the axial direction through a bottom surface 12*a* of the gear housing depression 12 in the outer peripheral portion. The through holes 2*b* are arranged at equal intervals in the circumferential direction. The through holes 2*b* are used to secure the housing 2 to the base unit 102 together with the internal gear 3 and the first bearing 4. Bolts, which are not shown, are inserted from above into the through holes 2*b*.

<Internal Gear>

The internal gear 3 is made of a rigid material and shaped annularly. The axis of the internal gear 3 is aligned with the axis of rotation C. The outer peripheral surface of the internal gear 3 is fitted onto the inner peripheral surface 5*b* of the gear housing depression 12 in the housing 2. As the upper surface 3*a* of the internal gear 3 butts up against the bottom surface 12*a* of the gear housing depression 12, the internal gear 3 can be rightly positioned in the axial direction relative to the housing 2. The internal gear 3 has through holes 3*f* extending therethrough in the axial direction, which are aligned with the through holes 2*b* of the housing 2. Each of the through holes 3*f* is in communication with a corresponding one of the through holes 2*b* in the housing 2.

The top surface 3*a* of the internal gear 3 has an O-ring groove 3*b* in the inner peripheral portion thereof. An O-ring 13 is placed in the O-ring groove 3*b*. The O-ring 13 provides sealing between the internal gear 3 and the housing 2. The internal gear 3 has internal teeth 3*c* formed on the entire inner peripheral surface. The internal teeth 3*c* mesh with external teeth 5*a* of the external gear 5, which will be described below.

A bearing housing depression 14 is formed in the lower surface 3*d* of the internal gear 3 and occupies a large part of its outer peripheral portion. The bearing housing depression 14 is open downward and outward in the radial direction. The bearing housing depression 14 receives therein the first bearing 4. The bottom surface 14*a* of the bearing housing depression 14 has an O-ring groove 3*e* in the inner peripheral portion. An O-ring 15 is placed in the O-ring groove 3*e*. The O-ring 15 provides sealing between the internal gear 3 and the first bearing 4.

<First Bearing>

The first bearing 4 includes an outer ring 16, an inner ring 17, and a plurality of rolling elements or balls 18 interposed between the outer and inner rings 16 and 17. The inner peripheral surface of the inner ring 17 is fitted onto the outer peripheral surface of the bearing housing depression 14. As the top surface 17*a* of the inner ring 17 butts up against the bottom surface 14*a* of the bearing housing depression 14, the first bearing 4 can be rightly positioned in the axial direction relative to the internal gear 3.

The upper surface 17*a* of the inner ring 17 has internally threaded portions 17*b*, which are aligned with the through holes 3*f* in the internal gear 3. Each of the internally threaded portions 17*b* is in communication with a corresponding one of the through holes 3*f* in the internal gear 3. Although not shown, bolts are inserted through the through holes 2*b* in the housing 2 from above and through the through holes 3*f* in the internal gear 3 and tightened into the internally threaded portions 17*b* in the inner ring 17. In this manner, although not shown, the bolts can assemble the housing 2, internal gear 3, and inner ring 17 of the first bearing 4 into a single unit and secure them to the base unit 102.

A plurality of through holes 16*a* extend through the outer ring 16 of the first bearing 4 in the outer peripheral portion in the axial direction. The through holes 16*a* are arranged at equal intervals in the circumferential direction. The through holes 16*a* are used to assemble the outer ring 16 of the first bearing 4, external gear 5, and output plate 7 into a single unit via bolts, which are not shown.

A seal housing depression 19 is formed in the upper surface 16*b* of the outer ring 16 in the inner peripheral portion. A seal 20 is placed in the seal housing depression 19. The seal 20 provides sealing between the outer ring 16 and the inner ring 17 in the upper portion of the first bearing 4. The seal 20 can be any one of various seal members such as rubber oil seals. The lower surface 16*c* of the outer ring 16 is slightly below the lower surface 17*c* of the inner ring 17. The lower surface 16*c* of the outer ring 16 has an O-ring groove 16*d* in the inner peripheral portion. An O-ring 40 is placed in the O-ring groove 16*d*. The O-ring 40 provides sealing between the outer ring 16 and the external gear 5.

<External Gear>

The external gear 5 is made of an elastic material. For example, the external gear 5 is made from a thin metal plate. The external gear 5 has a cylindrical portion 21 and an external flange portion 22. The cylindrical portion 21 and the internal gear 3 are concentric, and the external flange portion 22 extends from the lower end of the cylindrical portion 21 by being bent outward in the radial direction. The cylindrical portion 21 extends between the upper surface 3*a* of the internal gear 3 and the lower surface 16*c* of the outer ring 16 of the first bearing 4. The cylindrical portion 21 has external teeth 5*a* on the outer peripheral surface, which are positioned to face the internal teeth 3*c* of the internal gear 3 in the radial direction. The external teeth 5*a* are meshed with the internal teeth 3*c* of the internal gear 3. The external teeth 5*a* are smaller in number than the internal teeth 3*c*. For example, the external teeth 5*a* are smaller in number by two than the internal teeth 3*c*.

The external flange portion 22 extends between the lower end of the cylindrical portion 21 and the outer peripheral surface of the outer ring 16 of the first bearing 4. When seen in the axial direction, the outer peripheral portion of the external flange portion 22 overlaps the lower surface 16*c* of the outer ring 16. The outer peripheral portion of the external flange portion 22 has a thick portion 22*a* that is thicker than the other portion. The thick portion 22*a* overlaps the outer ring 16 when seen in the axial direction. The thick portion 22*a* has through holes 22*b*, which are aligned with the through holes 16*a* in the outer ring 16. Each of the through holes 22*b* is in communication with a corresponding one of the through holes 16*a* in the outer ring 16.

<Output Plate>

The output plate 7 overlaps the thick portion 22*a* of the external flange portion 22 when seen in the axial direction. The output plate 7 is shaped like a circular plate. A pinion gear 107 is mounted on the lower surface 7*a* of the output plate 7. The pinion gear 107 transmits the power produced by the reducer-equipped motor 106 to the base unit 102, for example. The outer peripheral portion of the output plate 7 has a mating cylindrical portion 23 that projects toward the first bearing 4. The outer peripheral surface of the thick portion 22*a* and a portion of the outer peripheral surface of the outer ring 16 of the first bearing 4 are fitted to the inner peripheral surface of the mating cylindrical portion 23. In this manner, the housing 2, internal gear 3, first bearing 4, external gear 5, and output plate 7 can be rightly positioned relative to each other in the radial and axial directions.

The outer peripheral portion of the output plate 7 has through holes 7*b*, which are positioned radially inside the mating cylindrical portion 23 and aligned with the through holes 22*b* in the thick portion 22*a*. Each of the through holes 7*b* is in communication with a corresponding one of the through holes 22*b* in the thick portion 22*a*. Thus, although not shown, bolts are inserted from above through the through holes 16*a* in the outer ring 16, the through holes 22*b* in the thick portion 22*a*, and then the through holes 7*b* in the output plate 7, to be tightened into internally threaded portions in the pinion gear 107, which are also not shown. In this manner, although not shown, the bolts can assemble the outer ring 16 of the first bearing 4, external gear 5, and output plate 7 into a single unit and secure them onto the pinion gear 107. While the pinion gear 107 is removed, the outer ring 16 of the first bearing 4, external gear 5 and output plate 7 can be assembled into a single unit with bolts and nuts, which are not shown.

The upper surface 7*c* of the output plate 7 has an O-ring groove 7*d*. The O-ring groove 7*d* is positioned slightly inside the through holes 7*b* in the radial direction. An O-ring 25 is placed in the O-ring groove 7*d*. The O-ring 25 provides sealing between the thick portion 22*a* and the output plate 7. The output plate 7 has a shaft insertion hole 24 at the center in the radial direction. The shaft insertion hole 24 penetrates through the output plate 7 in the axial direction. The reducer shaft 8 is inserted through the shaft insertion hole 24. An O-ring 25 is placed in the shaft insertion hole 24 in the output plate 7 to provide for sealing between the output plate 7 and the reducer shaft 8.

The upper surface 7*c* of the output plate 7 has a cylindrical bearing boss 27, which is integrated with the upper surface 7*c* and projects upwards. The bearing boss 27 is radially outside the shaft insertion hole 24. The outer peripheral surface of a third bearing 28 is fitted onto the inner peripheral surface of the bearing boss 27. Via the third bearing 28, the lower end of the reducer shaft 8 is rotatably supported in the output plate 7. The third bearing 28 is a deep groove ball bearing, for example. The present disclosure, however, is not limited to such, and various bearings can be used.

<Reducer Shaft>

The reducer shaft 8, which is rotatably supported at its respective ends by the two bearings 11 and 28, is hollow. The reducer shaft 8 has a stepped outer peripheral surface. More specifically, the outer peripheral surface of the reducer shaft 8 is divided into seal outer peripheral surfaces 8*a* at the respective ends, bearing outer peripheral surface 8*b* positioned axially inside the seal outer peripheral surfaces 8*a*, and a shaft body outer peripheral surface 8*c* between the two bearing outer peripheral surfaces 8*b*.

On the seal outer peripheral surfaces 8*a*, the seals 10 and 26 are mounted. On the bearing outer peripheral surfaces 8*b*, the second and third bearings 11 and 28 are mounted. The bearing outer peripheral surfaces 8*b* have a greater diameter than the seal outer peripheral surfaces 8*a* via steps 8*d*. The shaft body outer peripheral surface 8*c* has a greater diameter than the bearing outer peripheral surfaces 8*b* via steps 8*e*. The bearings 11 and 28 respectively butt up against the corresponding steps 8*d* and 8*e*, which can rightly position the bearings 11 and 28 relative to the reducer shaft 8 in the axial direction.

<Wave Generator>

The wave generator 6 is located, in the radial direction, between the shaft body outer peripheral surface 8*c* of the reducer shaft 8 and the external teeth 5*a* of the external gear 5 (internal teeth 3*c* of the internal gear 3). The wave generator 6 has a cam 31 and a fourth bearing 32 (an example of a bearing set forth in the claims). The cam 31 is integral with the shaft body outer peripheral surface 8*c*, and the fourth bearing 32 is arranged between the outer peripheral surface 31*a* of the cam 31 and the inner peripheral surface 21*a* of the cylindrical portion 21 of the external gear 5.

<Cam>

FIG. 3 is a radial sectional view showing the cam 31. As shown in FIGS. 2 and 3, the cam 31 projects outward in the radial direction from the shaft body outer peripheral surface 8*c*. The outer peripheral surface 31*a* of the cam 31 is shaped like an ellipse when seen in the axial direction.

<Fourth Bearing>

The fourth bearing 32 is, for example, a deep groove ball bearing. The fourth bearing 32 includes an outer ring 33, an inner ring 34, a plurality of rolling elements or balls 35 interposed between the outer and inner rings 33 and 34, and a retainer 36 for rollingly retaining the balls 35. The outer peripheral surface of the outer ring 33 is in contact with the inner peripheral surface 21*a* of the cylindrical portion 21 of the external gear 5. The inner peripheral surface of the inner ring 34 is fitted onto the outer peripheral surface 31*a* of the cam 31. The length L1 of the inner ring 34 in the axial direction is less than the length L2 of the outer ring 33 in the axial direction. The length L3 of the cam 31 in the axial direction is approximately equal to the length L1 of the inner ring 34 in the axial direction.

<Retainer>

The retainer 36 is an annular member for retaining the balls 35 at equal intervals in the circumferential direction. The retainer 36 has grippers 36*a* and couplers (not shown). The grippers 36*a* are configured to rollingly grip the balls 35 from outside in the axial direction, and the couplers are each configured to couple circumferentially adjacent ones of the grippers 36*a*. When seen in the radial direction, the grippers 36*a* project slightly downward beyond the lower edge of the inner ring 34 in the axial direction.

<Restricting Portion>

The shaft body outer peripheral surface 8*c* has a restricting portion 37, which is integrated with the lower end of the cam 31. The restricting portion 37 is shaped like a brim so that it extends radially outward beyond the outer peripheral surface 31*a* of the cam 31. The restricting portion 37 is circularly shaped when seen in the axial direction. Being integrated with the lower end of the cam 31, the restricting portion 37 faces the retainer 36 (the grippers 36*a*) of the fourth bearing 32 in the radial direction. The lower end of the inner ring 34 of the fourth bearing 32 butts up against the upper surface 37*a* of the restricting portion 37. This restricts the fourth bearing 32 from moving in the axial direction.

The length d1 of the minor axis of the cam 31, the thickness t of the inner ring 34 of the fourth bearing 32, and the diameter Φd of the restricting portion satisfy the following expressions.

$$D1=d1+2\times t \quad (1)$$

$$D1\geq\Phi d>d1 \quad (2)$$

Therefore, the retainer 36 (grippers 36*a*) of the fourth bearing 32 face the restricting portion 37 in the radial direction with a gap G therebetween. This ensures that the restricting portion 37 protrudes in the radial direction beyond the outer peripheral surface 31*a* of the cam 31. Accordingly, the restricting portion 37 reliably restricts the fourth bearing 32 from moving in the axial direction.

The length d2 of the major axis of the cam 31, the thickness t of the inner ring 34 of the fourth bearing 32, and the diameter Φd of the restricting portion 37 satisfy the following expressions.

$$D2=d2+2\times t \quad (3)$$

$$\Phi d\leq D2 \quad (4)$$

Therefore, the restricting portion 37 can be certainly saved from touching the retainer 36.

<How Strain Wave Gear Device Works>

The following now describes how the strain wave gear device 1 of the reducer-equipped motor 106 works. The strain wave gear devices of the other reducer-equipped motors 113*a* to 113*f* in the robot body 103 work in the same manner as the strain wave gear device 1 of the reducer-equipped motor 106 provided on the base unit 102.

The outer peripheral surface 31*a* of the cam 31 of the wave generator 6 is shaped like an ellipse when seen in the axial direction. Via the fourth bearing 32, the external gear 5 is elastically deformed, so that the external teeth 5*a* partially mesh with the internal teeth 3*c* of the internal gear 3. While the partial meshing holds, the electric motor 110 is driven and the motor shaft 110*a* is resultantly rotated. Together with the motor shaft 110*a*, the reducer shaft 8 is rotated. Together with the reducer shaft 8, the cam 31 is rotated. In other words, the cam 31 of the wave generator 6 serves as an input part for receiving the rotational force produced and fed by the motor shaft 110*a* of the electric motor 110.

The difference in number of teeth between the external and internal teeth 5*a* and 3*c* causes the internal and external gears 3 and 5 to rotate relative to each other around the axis of rotation C, while their meshing moves in the circumferential direction. In the present embodiment, the external teeth 5*a* are smaller in number than the internal teeth 3*c*. Therefore, the external gear 5 rotates at a lower rotational speed than the reducer shaft 8. The external gear 5 rotates while being elastically deformed.

The external flange portion 22 of the external gear 5 is assembled with the outer ring 16 of the first bearing 4 and with the output plate 7 intro a single unit. Therefore, the outer ring 16 of the first bearing 4 and the output plate 7 rotate at a speed obtained by reducing the rotation of the motor shaft 110*a* (reducer shaft 8), thereby outputting the reduced speed. In other words, the external gear 5 serves as an output part for changing (in the present embodiment reducing) the speed of the rotation of the cam 31 serving as the input part and outputting the resulting rotation. As the output plate 7 rotates, the pinion gear 107 resultantly rotates. This causes the base unit 102 to slide along the traveling rail 101 (see FIG. 1).

As the strain wave gear device 1 is driven, the external gear 5 elastically deforms to generate a downward thrust force in the wave generator 6. The cam 31 of the wave generator 6 is integrated with the reducer shaft 8. The reducer shaft 8 is restricted from moving in the axial direction by the second and third bearings 11 and 28, which sandwich the reducer shaft 8 in the axial direction. This causes the downward thrust force to act on the fourth bearing 32 of the wave generator 6.

On the shaft body outer peripheral surface 8*c* of the reducer shaft 8, the restricting portion 37 is integrally formed. The restricting portion 37 is at the lower end of the cam 31. The restricting portion 37 is shaped like a brim so that it extends radially outward beyond the outer peripheral surface 31*a* of the cam 31. The lower end of the inner ring 34 of the fourth bearing 32 butts up against the restricting portion 37. Accordingly, the restricting portion 37 can restrict the fourth bearing 32 from moving in the axial direction.

In the above-described strain wave gear device 1, the restricting portion 37 can restrict the fourth bearing 32 from moving in the axial direction. This provides for correct and continuous meshing between the internal teeth 3*c* of the internal gear 3 and the external teeth 5*a* of the external gear 5. In this manner, the strain wave gear device 1 can stably operate. The restricting portion 37 is formed such that it does not touch the retainer 36 of the fourth bearing 32. Therefore, the fourth bearing 32 can be saved from being damaged by the restricting portion 37.

The restricting portion 37 faces the retainer 36 (grippers 36*a*) with the gap G in the radial direction to avoid touching the retainer 36 of the fourth bearing 32. In this manner, while being simply structured, the restricting portion 37 can still avoid touching the retainer 36.

The restricting portion 37 has a circular shape when viewed in the axial direction. The length d1 of the minor axis of the cam 31, the thickness t of the inner ring 34 of the fourth bearing 32, and the diameter Φd of the restricting portion 37 satisfy the above-mentioned expressions (1) and (2). Therefore, the restricting portion 37 can be simply configured, reliably avoid touching the retainer 36, and also reliably restrict the fourth bearing 32 from moving in the axial direction.

The length d2 of the major axis of the cam 31, the thickness t of the inner ring 34 of the fourth bearing 32, and the diameter Φd of the restricting portion 37 satisfy the above-mentioned expressions (3) and (4). Accordingly, the restricting portion 37 can more reliably avoid touching the retainer 36 and more reliably restrict the fourth bearing 32 from moving in the axial direction. The restricting portion 37 is integrated with the lower end of the cam 31 and with the shaft body outer peripheral surface 8*c*. Therefore, the restricting portion 37 can be easily provided. The above-described wave generator 6 was applied to the reducer-equipped motors 106, 113*a* to 113*f*, which were used in the industrial robot 100. The fourth bearing 32 can be thus saved from being damaged, and the industrial robot 100 can stably and reliably operate.

The present disclosure is not limited to the above embodiment but encompasses various modifications of the above embodiments not departing from the purport of the present disclosure. For example, in the above-described embodiment, the industrial robot 100 uses the reducer-equipped motors 106, 113*a* to 113*f*, each of which includes the strain wave gear device 1. The disclosure, however, is not limited to such, and the strain wave gear device 1 can be employed in driving units of various industrial robots other than the industrial robot 100. Such industrial robots include, for example, electric wheelchairs, traveling equipment, and various processing machines such as multitasking machines. For example, the strain wave gear device 1 can be employed in the drive unit (traveling unit) of electric wheelchairs, traveling equipment, and processing machines.

According to the above-described embodiment, the electric motor 110 is used as a power generating unit for generating a rotational force for the cam 31 serving as an input part. The disclosure, however, is not limited to such, and any power generating units can be used as long as they are capable of generating a rotational force for the cam 31. For example, the electric motor 110 can be replaced by a hydraulic motor, an engine or other power generating units.

In the above-described embodiment, the fourth bearing 32 is a deep groove ball bearing, for example. The disclosure, however, is not limited to such, and any bearings can be used as long as they have an outer ring, an inner ring, rolling elements and a retainer. Other rolling elements than the balls 35 can be used. For example, the rolling elements can be cylindrical rollers in place of the balls 35.

According to the above-described embodiment, the cam 31 of the wave generator 6 serves as the input part for receiving the rotational force produced and fed by the motor shaft 110*a* of the electric motor 11. The external gear 5 serves as the output part for changing the speed of the rotation of the cam 31 and outputting the resulting rotation. The disclosure, however, is not limited to such. The external gear 5 may serve as an input part, and the cam 31 (reducer shaft 8) may serve as an output part.

According to the above-described embodiment, the outer peripheral surface 31*a* of the cam 31 is shaped like an ellipse when seen in the axial direction. The disclosure, however, is not limited to such, and the outer peripheral surface 31*a* of the cam 31 can be shaped in any manner as long as it has a non-circular shape. For example, the outer peripheral surface 31*a* of the cam 31 may be shaped like a polygon when seen in the axial direction. The outer peripheral surface 31*a* of the cam 31 is desirably shaped like an ellipse or oval with a major axis and a minor axis when viewed in the axial direction.

In the above-described embodiment, the O-ring 13 is provided for establishing sealing between the internal gear 3 and the housing 2. The O-ring 15 is provided for establishing sealing between the internal gear 3 and the first bearing 4. The O-ring 25 is provided for establishing sealing between the thick portion 22*a* and the output plate 7. The O-ring 40 is provided for establishing sealing between the outer ring 16 and the external gear 5. The disclosure, however, is not limited to such, and the O-rings 13, 15, 25 and 40 can be replaced with various seal members.

In the above-described embodiment, the strain wave gear device 1 includes the housing 2. The disclosure, however, is not limited to such, and the strain wave gear device 1 may be constituted without the housing 2. For example, the internal gear 3 may be directly mounted on the base unit 102 or other parts. Alternatively, the reducer shaft 8 may be rotatably supported directly by the base unit 102 or other parts. In the above-described embodiment, the strain wave gear device 1 includes the output plate 7. Via the output plate 7, the rotation of the motor shaft 110*a* (reducer shaft 8) is output. The present disclosure, however, is not limited to such, and the rotation of the motor shaft 110*a* (reducer shaft 8) may be output directly from the external gear 5.

According to the above-described embodiment, the bolts, which are not shown, are used to assemble the housing 2, internal gear 3, and inner ring 17 of the first bearing 4 into a single unit and secure them to the base unit 102. The present disclosure, however, is not limited to such, and the internal gear 3 and the inner ring 17 of the first bearing 4 can be secured in various manners. For example, the internal gear 3 and the inner ring 17 of the first bearing 4 may be secured to each other in advance. While the housing 2, internal gear 3, and inner ring 17 of the first bearing 4 are secured to each other in advance, and they may be then secured onto the mating member (for example, the base unit 102 or the like).

In the above embodiment, the reducer shaft 8 is hollow. The present disclosure, however, is not limited to such, and the reducer shaft 8 may be solid. The reducer shaft 8 may be provided with, for example, a spur gear, and the rotation of the motor shaft 110*a* may be transmitted to the reducer shaft 8 via the spur gear. The bearings 11 and 28 may not be used, and a shaft extending from the mating member may be used in place of the reducer shaft 8.

According to the above-described embodiment, the restricting portion 37 is shaped like a circle when seen in the axial direction. The disclosure, however, is not limited to such. When the outer peripheral surface 31*a* of the cam 31 is shaped like an ellipse or oval when seen in the axial direction, the restricting portion 37 may only be required to extend at least over the minor axis of the cam 31. The restricting portion 37 may not need to extend over the major axis of the cam 31 long enough to protrude outward in the radial direction beyond the outer peripheral surface 31*a* of the cam 31. The restricting portion 37 can still restrict the fourth bearing 32 from moving in the axial direction as long as the restricting portion 37 extends over the minor axis of the cam 31 long enough to protrude outward in the radial direction beyond the outer peripheral surface 31*a* of the cam 31. With such features, the size of the restricting portion 37 can be minimized while the restricting portion 37 is still reliably capable of restricting the fourth bearing 32 from moving in the axial direction.

In the embodiment described above, the restricting portion 37 may be shaped like a polygon or other shapes. The restricting portion 37 may not be integrated with the reducer shaft 8 or cam 31 but separately provided. For example, the restricting part 37 may be configured in the following manner.

Modification Example of Restricting Portion

Figure 4:
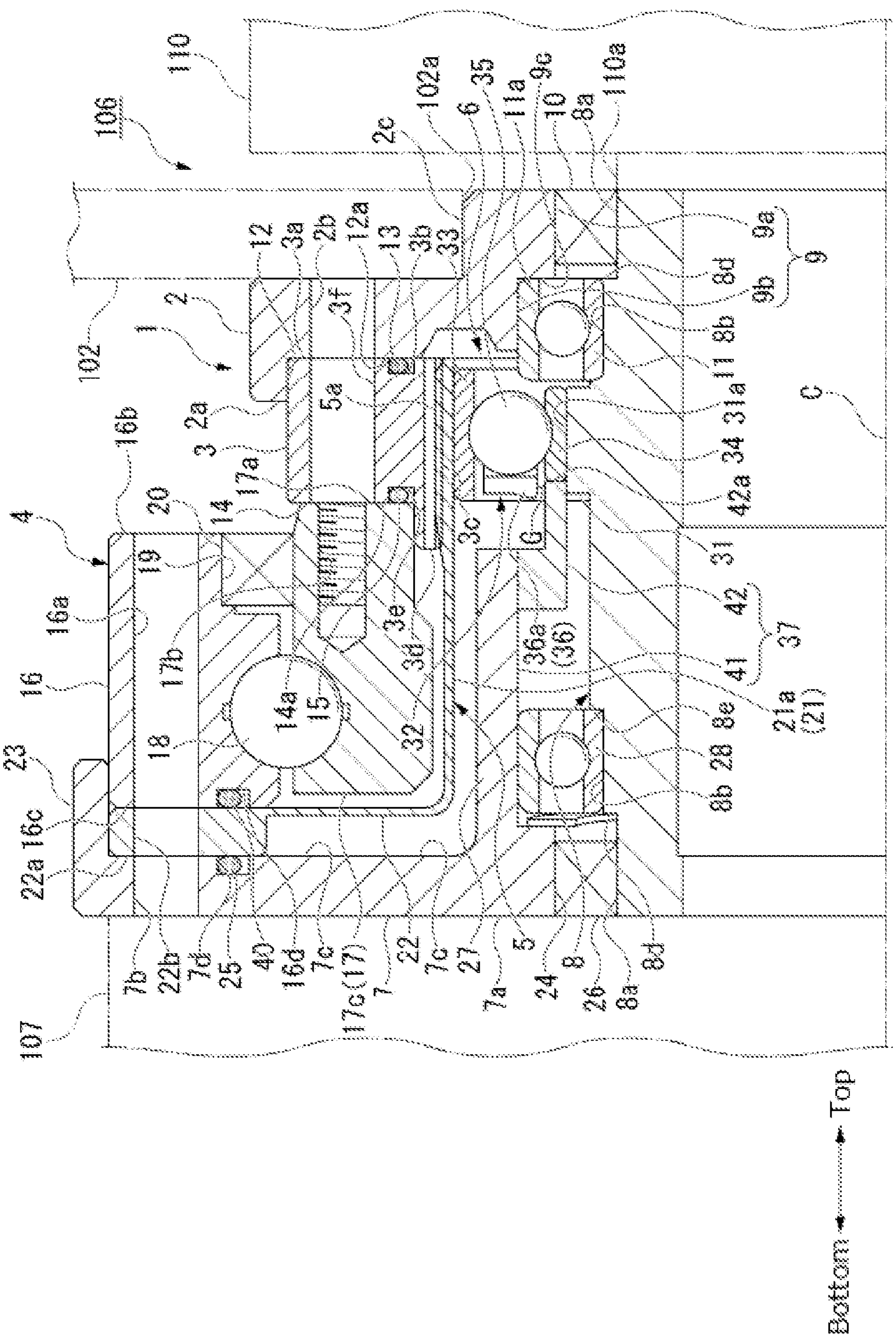
FIG. 4 is a sectional view showing a modification example of a restricting portion relating to an embodiment of the present disclosure.

FIG. 4 is a sectional view showing a modification example of the restricting portion 37 along the axis of rotation C. FIG. 4 corresponds to FIG. 2 referred to in the above. As shown in FIG. 4, the restricting portion 37 may have a support 41 and a body 42. The support 41 extends from the upper end of the bearing boss 27 toward the fourth bearing 32, and the body 42 is provided on the support 41. The body 42 is fixedly attached to the support 41 using bolts, which are not shown, or welding.

The body 42 of the restricting portion 37 extends in the axial direction from the support 41 and its end 42*a* butts up against the inner ring 34 of the fourth bearing 32. More specifically, the body 42 avoids touching the retainer 36 of the fourth bearing 32 and restricts the fourth bearing 32 from moving in the axial direction. The modification example can still produce the same effects as the above-described embodiment.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

What is claimed is:

1. A strain wave gear device comprising:
an internal gear;
an external gear radially inside the internal gear, the external gear being flexible; and
a wave generator being in contact with an inner peripheral surface of the external gear,
wherein, while partially meshing with the internal gear, the external gear rotates relative to the internal gear about an axis of rotation,
wherein the wave generator causes the meshing between the internal and external gears to move in a circumferential direction extending around the axis of rotation,
wherein the wave generator includes:
a cam having a non-circular outer peripheral surface; and
a bearing between the inner peripheral surface of the external gear and the outer peripheral surface of the cam,
wherein the bearing includes:
an outer ring being in contact with the inner peripheral surface of the external gear;
an inner ring being in contact with the outer peripheral surface of the cam;
a plurality of rolling elements interposed between the inner ring and the outer ring; and
a retainer retaining the plurality of rolling elements,
wherein the strain wave gear device further comprises a restricting portion provided such that the restricting portion avoids touching the retainer,
wherein the restricting portion restricts the bearing from moving in a direction extending along the axis of rotation,
wherein the restricting portion has a circular shape when viewed in the direction extending along the axis of rotation,
wherein the restricting portion is shaped so as to extend radially outward beyond the outer peripheral surface of the cam,
wherein a radially outer end of the restricting portion radially faces the retainer with a gap therebetween,
wherein the outer peripheral surface of the cam is formed in an ellipse shape or an oval shape with a major axis and a minor axis when viewed in the direction extending along the axis of rotation,
wherein the restricting portion extends at least over the minor axis,
wherein, when d1 represents a length of the minor axis of the cam, t represents a thickness of the inner ring in a radial direction of the internal gear, and Φd represents a diameter of the restricting portion in the radial direction, expressions of $D1=d1+2\times t$ and $D1\geq\Phi d>d1$ are satisfied,
wherein the restricting portion has an upper surface and a lower surface,
wherein the upper surface butts up against a lower end of the inner ring of the bearing,
wherein the lower surface is on an opposite side of the upper surface,
wherein the lower surface faces a downward direction of the axis of rotation,
wherein a thickness of the retainer in the axis of rotation is larger than a thickness of the restricting portion in the axis of rotation, and
wherein the retainer protrudes from the lower surface of the restricting portion in the downward direction of the axis of rotation.

2. The strain wave gear device of claim 1, wherein, when d2 represents a length of the major axis of the cam, t represents a thickness of the inner ring in the radial direction, and Φd represents a diameter of the restricting portion in the radial direction, expressions of $D2=d2+2\times t$ and $\Phi d\leq D2$ are satisfied.

3. The strain wave gear device of claim 1, wherein the restricting portion is integrated with the cam.

4. An industrial robot comprising:
a power generating unit for generating a rotational force,
a strain wave gear device having an input part and an output part; and
a mating member mounted on the output part of the strain wave gear device,
wherein the input part is configured to receive the rotational force produced and fed by the power generating unit,
wherein the output part is configured to change a speed of rotation of the input part and output the rotation,
wherein the strain wave gear device includes:
an internal gear;
an external gear radially inside the internal gear, the external gear being flexible; and
a wave generator being in contact with an inner peripheral surface of the external gear,
wherein, while partially meshing with the internal gear, the external gear rotates relative to the internal gear about an axis of rotation,
wherein the wave generator causes the meshing between the internal and external gears to move in a circumferential direction extending around the axis of rotation,
wherein the wave generator includes:

a cam having a non-circular outer peripheral surface; and a bearing between the inner peripheral surface of the external gear and the outer peripheral surface of the cam, wherein the bearing includes:

an outer ring being in contact with the inner peripheral surface of the external gear;

an inner ring being in contact with the outer peripheral surface of the cam;

a plurality of rolling elements interposed between the inner ring and the outer ring; and a retainer retaining the plurality of rolling elements, wherein the strain wave gear device further comprises a restricting portion provided such that the restricting portion avoids touching the retainer, wherein the restricting portion restricts the bearing from moving in a direction extending along the axis of rotation, wherein one of the input part and the output part serves as the external gear, wherein the other of the input part and the output part serves as the cam, wherein the restricting portion has a circular shape when viewed in the direction extending along the axis of rotation, wherein the restricting portion is shaped so as to extend radially outward beyond the outer peripheral surface of the cam, wherein a radially outer end of the restricting portion radially faces the retainer with a gap therebetween, wherein the outer peripheral surface of the cam is formed in an ellipse shape or an oval shape with a major axis and a minor axis when viewed in the direction extending along the axis of rotation, wherein the restricting portion extends at least over the minor axis, wherein, when d1 represents a length of the minor axis of the cam, t represents a thickness of the inner ring in a radial direction of the internal gear, and Φd represents a diameter of the restricting portion in the radial direction, expressions of $D1=d1+2\times t$ and $D1\geq\Phi d>d1$ are satisfied, wherein the restricting portion has an upper surface and a lower surface, wherein the upper surface butts up against a lower end of the inner ring of the bearing, wherein the lower surface is on an opposite side of the upper surface, wherein the lower surface faces a downward direction of the axis of rotation, wherein a thickness of the retainer in the axis of rotation is larger than a thickness of the restricting portion in the axis of rotation, and wherein the retainer protrudes from the lower surface of the restricting portion in the downward direction of the axis of rotation.

* * * * *